Sept. 28, 1943.  I. L. CHURCH  2,330,679
COMBINATION BEAN PULLER AND HOE
Filed April 21, 1943
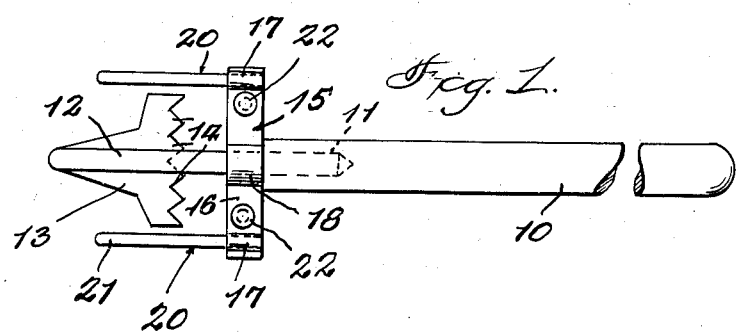
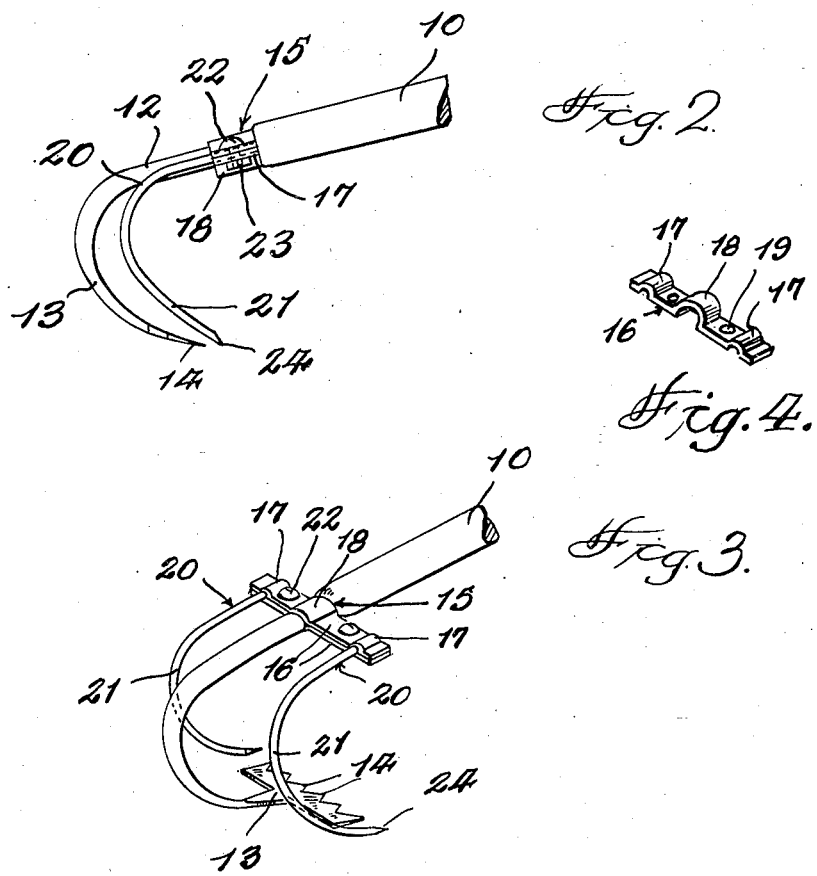
INVENTOR.
BY I. L. Church
ATTORNEY.

Patented Sept. 28, 1943

2,330,679

UNITED STATES PATENT OFFICE 2,330,679

COMBINATION BEAN PULLER AND HOE

Ira L. Church, Reed City, Mich., assignor to Lottie Sanford, Reed City, Mich.

Application April 21, 1943, Serial No. 483,932

1 Claim. (Cl. 97—62)

This invention relates to a combination gardening tool and it consists in the constructions, arrangements and combinations herein described and claimed.

It is the principal object of the invention to provide a gardening tool which may be quickly converted from a combination hoe and rake device to a simple hoe which may be employed in the usual hand cultivation of crops.

More specifically it is an object of the invention to provide a novel means for securing the rake tines upon the shank of the hoe in a secure manner and in proper relation to opposite sides of the cutting edge of the hoe blade.

Additional objects, advantages and features of invention will be apparent from the following description and accompanying drawing, wherein Figure 1 is a top plan view of the invention.

Figure 2 is a side elevation thereof.

Figure 3 is a perspective view of the combination implement.

Figure 4 is a perspective view of one of the plates constituting a mounting bracket.

There is illustrated a handle 10 of conventional form having a bore 11 at one end in which there is secured a shank 12 of a hoe blade 13. The cutting edge of the blade is shown as serrated, forming a plurality of teeth 14, in the present instance but if desired, the edge may be constructed as a straight cutting edge.

It will be noted that the shank 12 is of considerable length and curved downwardly and rearwardly in the direction of the handle 10 whereby the cutting edge is presented at an angle most effective in striking the ground surface.

A bracket or clamp device 15 is employed, which consists of a pair of metal plates 16 of identical formation. The plates 16 are of a length greater than the width of the cutting blade, for a purpose as will presently appear.

Inwardly of respective ends of the plates, corrugations 17 are formed extending transversely of the plates and lying in a plane parallel to the handle; and intermediately of the length of the plates corrugations 18 are formed of greater radius than the corrugations 17. The plates 16 are further formed with apertures 19 positioned between each corrugation 17 and the corrugation 18.

When assembling the bracket, a pair of plates 16 are employed, the corrugations 17 are aligned, thus forming circular recesses for reception of respective shanks 20 of tine members 21. A bolt 22 is extended through respective apertures 19 and receives a nut 23 for drawing the plates together. The corrugations 18 receive the shank 12 of the hoe therethrough and by finally tightening the nuts 23 the plates 16 will firmly grip the shanks 12 and 20. The tines 21 are curved downwardly, terminating in a point 24 slightly in advance of the cutting edge 14 of the hoe. Preferably the shanks 20 are shorter than the shank 12, bringing the bight portion of the tines 21 slightly in advance of the bight of the shank 12, which will permit the tines 21 to engage vines and the like in advance of the bight portion of the hoe 13.

It will be apparent that the tool may be used as a combination device, or when desired, the tines 21 may be readily removed by merely loosening the nut 23 and bolt 22.

While I have specifically shown and described my invention, this is by way of illustration only, and I consider as my own, all such modifications in construction as fairly fall within the scope of the appended claim.

I claim:

A combined bean puller and hoe comprising a handle, a hoe member having a shank engaged in one end of the handle and having a serrated cutting edge, a bracket member detachably connected to the shank, the bracket consisting of a pair of superposed plates, each having registered corrugations for reception of the shank therebetween, and further having respective registered corrugations adjacent the ends of the plate, a tine member engaged in each of the registered corrugations and bolt means extended through plates for drawing the corrugations firmly about the shanks of the hoe and tines.

IRA L. CHURCH.